(12) United States Patent
von Helmolt et al.

(10) Patent No.: US 9,037,506 B2
(45) Date of Patent: May 19, 2015

(54) SYSTEMS AND METHODS FOR CONSOLIDATING SHIPMENTS

(75) Inventors: Hans-Ulrich von Helmolt, Heidelberg (DE); Carsten Kreuels, Contwig (DE); Wolfram Schick, Karlsruhe (DE)

(73) Assignee: SAP AG, Walldorf (DE)

( * ) Notice: Subject to any disclaimer, the term of this patent is extended or adjusted under 35 U.S.C. 154(b) by 2569 days.

(21) Appl. No.: 11/607,948

(22) Filed: Dec. 4, 2006

(65) Prior Publication Data

US 2007/0130102 A1 Jun. 7, 2007

(30) Foreign Application Priority Data

Dec. 5, 2005 (EP) ..................................... 05111709

(51) Int. Cl.
*G07F 7/10* (2006.01)
*G06Q 10/06* (2012.01)
*G06Q 10/08* (2012.01)

(52) U.S. Cl.
CPC .............. *G06Q 10/06* (2013.01); *G06Q 10/087* (2013.01)

(58) Field of Classification Search
USPC ......................................................... 705/330
See application file for complete search history.

(56) References Cited

U.S. PATENT DOCUMENTS

2003/0172007 A1* 9/2003 Helmolt et al. ................. 705/28
2006/0041481 A1* 2/2006 Stowe ............................ 705/16

* cited by examiner

*Primary Examiner* — Ramsey Refai
(74) *Attorney, Agent, or Firm* — Finnegan, Henderson, Farabow, Garrett & Dunner, LLP

(57) ABSTRACT

Systems and methods are provided for managing the delivery of ordered products from at least one supplier location to a customer via at least one consolidation location within a supply chain management system. In one embodiment, the availability of the ordered products is checked based on a plurality of ATP rules, the plurality of ATP rules comprising the at least one supplier location which is to be checked for availability of the ordered products. Furthermore, at least one ATP rule further defines the at least one consolidation location and the at least one consolidation location is selected from the at least one ATP rule and checked for availability of the ordered products.

25 Claims, 5 Drawing Sheets

SYSTEMS AND METHODS FOR CONSOLIDATING SHIPMENTS

TECHNICAL FIELD

The present invention relates generally to the field of data processing and to systems and methods for managing products within one or more e-business systems. More particularly, and without limitation, the present invention relates to systems and methods for optimizing a delivery process of ordered products within a supply chain management system.

BACKGROUND INFORMATION

The success of a company depends essentially on the requirement that demands on goods and services be fulfilled precisely, cost-efficiently, and on time. Therefore, many companies make use of a supply chain management system to control and optimize their production and delivery processes.

Supply chain management may include the process of coordinating the flow of goods, services, information and finances between the involved parties, such as manufactures, suppliers, wholesalers, retailers, and consumers. This process may include, among others, order processing, information feedback, and timely delivery of the ordered goods and services.

Processes within supply chain management may include checking whether a quantity of products ordered by a customer is available at some location, for example, warehouses and production plants, at a given time. This is denoted as an Available-to-Promise (ATP) check. Various ways of selecting particular locations and checking the availability of products at these locations may be defined using a number of rules. These rules are denoted as "ATP rules." The rules to be applied may be determined based on the particular order which is to be ATP checked.

Sometimes the quantity of products ordered can be met only by combining product availabilities at multiple locations together. In such cases, the products may be shipped from these multiple locations directly to the customer.

In some cases, however, the products from one or more locations may be shipped to a particular location where the products are processed before they are shipped to the customer. This process is denoted as a consolidation process. One reason for using a consolidation process may be, for example, to send the ordered products together in one delivery to the customer. Another reason may be in cases of foreign trade or export business, for example, if only a particular location has the capability to prepare export licenses.

SUMMARY

In accordance with embodiments of the present invention, systems and methods are provided for managing products and consolidating shipments. Embodiments of the invention include systems and methods for optimizing the delivery process of ordered products from a supplier to a customer via, for example, a consolidation location within a supply chain management system.

Consistent with an embodiment of the present invention, systems and methods may be provided for managing the delivery of ordered products from at least one supplier location to a customer via at least one consolidation location within a supply chain management system, whereby availability of the ordered products is checked based on a plurality of ATP rules. The ATP rules may include a rule to check at least one supplier location for availability of the ordered products. Further, at least one ATP rule may define the consolidation location, and the consolidation location may be selected from the ATP rule and checked for availability of the ordered products.

In one embodiment consistent with the present invention, the ATP rules further comprise at least one consolidation location which may be excluded from the availability check. The excluded consolidation location may have a plurality of validity periods which define the validity of the exclusion.

In accordance with another embodiment, the ATP rules may further comprise at least one alternative consolidation location with respect to an excluded consolidation location. A consolidation location may be replaced by an externally specified consolidation location.

Furthermore, in accordance with an embodiment of the invention, the ATP rules may comprise alternative products for the ordered products. Still further, in accordance with an embodiment of the present invention, the ATP rules may further comprise a result correlation flag indicating whether a delivery date correlation of the products to be delivered from a consolidation location to the customer is to be performed at the consolidation location.

Embodiments of the present invention further relate to computer-implemented methods for managing the delivery of ordered products. In accordance with one embodiment, a computer-implemented method is provided that comprises the steps of determining at least one ATP rule out of a plurality of ATP rules and performing an availability check according to the determined at least one ATP rule. Furthermore, the computer-implemented method may comprise the steps of creating at least one stock transfer order which triggers transfer of the products from at least one supplier location to at least one consolidation location and performing a delivery date correlation at the at least one consolidation location.

In accordance with an embodiment, the step of determining the at least one ATP rule may be performed based on a set of definable parameters.

In accordance with another embodiment, the step of performing an availability check may comprise the sub-steps of performing an availability check according to the selected at least one consolidation location or according to the externally specified consolidation location, performing a product replacement within the at least one consolidation location, performing an availability check according to the at least one alternative consolidation location, performing a product replacement at the at least one alternative consolidation location, performing an availability check according to the supplier locations, and performing a product replacement within the supplier locations.

The sub-step of performing an availability check according to the selected at least one consolidation location or according to the external consolidation location may be performed as the first sub-step.

Embodiments consistent with the present invention also relate to an apparatus comprising a data storage device which stores a plurality of ATP rules, a plurality of supplier locations and a plurality of consolidation locations. The apparatus also comprises means for performing an availability check.

In one embodiment, the means for performing an availability check may be adapted to determine at least one ATP rule, perform an availability check according to the determined ATP rules, create at least one stock transfer order which triggers the transfer of the products from the at least one supplier location to the at least one consolidation location, and perform a result correlation at the at least one consolidation location.

Additional embodiments consistent with the present invention relate to a computer-readable medium comprising computer-executable instructions, which when loaded into a computer system, perform methods consistent with the present invention, such as that described herein.

Embodiments consistent with the present invention may offer more flexibility in defining a consolidation location. The consolidation location can be freely defined in the ATP rule, for example. Furthermore, methods consistent with the present invention may be more user-friendly because the consolidation location may be directly visible in the ATP rule.

Consistent with embodiments of the present invention, it is possible to combine consolidation with product substitution. Additionally, validities may be assigned to a consolidation location. Also, alternative locations may be defined for the consolidation location.

BRIEF DESCRIPTION OF THE DRAWINGS

The accompanying drawings, which are incorporated in and constitute a part of this specification, illustrate embodiments consistent with the present invention and together with the description, serve to explain the principles of the invention.

In the drawings.

DETAILED DESCRIPTION

Consistent with the present invention, a consolidation location to be used for particular orders may be either automatically defined in a set of ATP rules or manually entered. If a consolidation location is closed or unavailable due to, for example, maintenance or natural disasters, alternative consolidation locations may be used within the delivery process.

Consistent with the present invention, the determination of the ATP rules to be applied within an ATP check may be based on a plurality of parameters, such as customer and order fields. The ATP rules may further define alternative products for ordered products which are temporarily not available, or for ordered products for which only successor products are available. Furthermore, the ATP rules may define alternative product locations, for example, if a product is not available at a first given location. These alternative locations are also referred to herein as "location replacements." Accordingly, the consolidation locations may be freely defined according to different business requirements, and the delivery of products may be better optimized.

The ATP rules may further comprise a flag indicating whether a delivery date correlation has to be performed at the consolidation location. Delivery date correlation will be explained below with reference to FIGS. 2 and 3.

Figure 1:
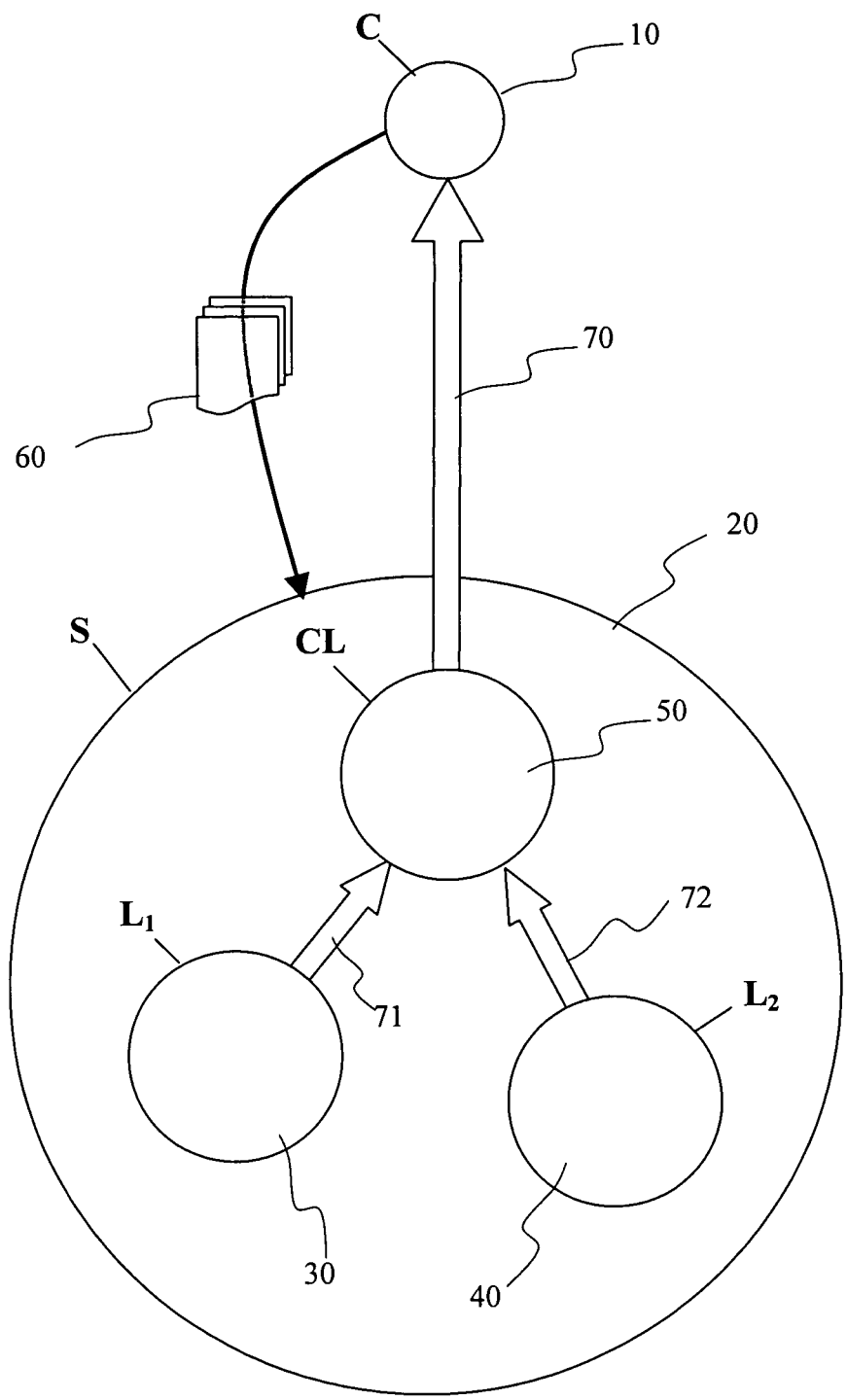
FIG. 1 illustrates an exemplary delivery process via a consolidation location, consistent with an embodiment of the invention.

FIG. 1 illustrates an exemplary order-and-delivery process via a consolidation location, consistent with an embodiment of the invention. A customer 10 sends an order 60 to a supplier 20. The order 60 may be in the form of an electronic order transmitted by email or a traditional order transmitted by mail. The order 60 comprises information about the ordered products and the quantity of the ordered products. Supplier 20 feeds the data about the order 60 into the supply chain management system which processes this order 60.

Within the supply chain management system, an ATP check with respect to the ordered products may be performed. In this exemplary embodiment, the product locations 30 and 40 are identified as product locations where the ordered quantity of products are available, whereby each of the product locations 30 and 40 can provide a part of the products according to the customer order 60. These parts may be shipped as two partial deliveries 71 and 72 from the product locations 30 and 40 to the consolidation location 50.

At the consolidation location 50, these two partial deliveries 71 and 72 may be processed according to several predefined requirements. These requirements may comprise preparing export licenses or transport documents, for example. From the consolidation location 50, the products are either shipped as one or several deliveries to the customer 10, depending on a flag for delivery date correlation, for example. The details of the order-and-delivery process with consolidation are further illustrated via the exemplary embodiment in FIG. 2.

Figure 2A:
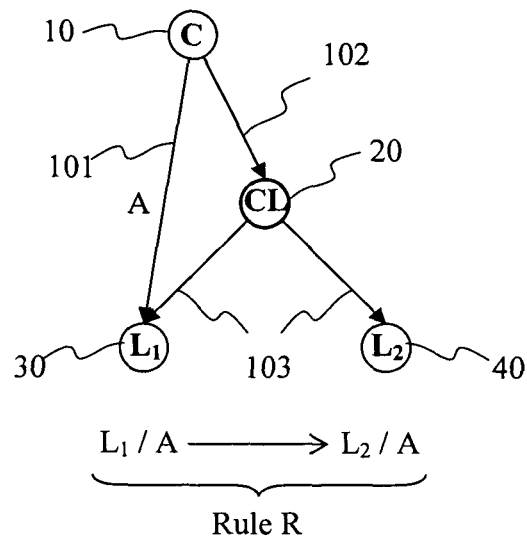
FIGS. 2a, 2b, 2c illustrate an exemplary scheduling process for consolidation, consistent with an embodiment of the invention.

FIG. 2a illustrates the first part of an exemplary scheduling process. Customer 10 enters an order for a certain quantity of product A. The input location, i.e., the location which received the customer order, is the product location $L_1$, 30. The input of the customer order triggers an ATP check for the ordered quantity of product A. Within the ATP check, an ATP rule R is determined for product A and the product location $L_1$, 30. This ATP rule R contains the location replacements $L_1$, 30 and $L_2$, 40. In one embodiment, a location replacement specifies by which location a particular location is replaced in case the particular location cannot provide the quantity of products according to the order.

In this exemplary embodiment, during the ATP check, the product location $L_1$, 30 is replaced by the product location $L_2$, 40 if the required quantity of products cannot be provided completely from product location $L_1$, 30.

In one embodiment consistent with the present invention, the ATP rules which are to be applied for a particular order may be determined using a condition technique. The condition technique may provide means for selecting a set of ATP rules according to a plurality of parameters, for example, customer and order data. As illustrated in FIG. 2a, the ATP rule R additionally contains the consolidation location CL, 20. Since the consolidation location is defined within the ATP rule, the consolidation location may depend on various customer and order related properties.

A consolidation process is performed when a consolidation location is either manually entered or specified in the ATP rule to be applied. Thus, the consolidation process may be triggered by customer and order related properties. As such, the consolidation may be performed, for example, for a specific product, customer, order type, or a specific customer profile.

In a first scheduling step 101, the material availability date may be calculated from the delivery date at which the delivery to the customer should take place. The material availability date is the latest date on which the product must be available. On or before this latest date, a vendor must start the activities relevant for delivery, such as picking and packing the products. This step may be carried out by default before any possibly defined ATP rule is evaluated.

Then the ATP rules are evaluated in order to determine the product locations $L_1$, 30 and $L_2$, 40 and the consolidation location CL, 20.

Since the consolidation location CL, 20 has been determined by the rules evaluation, the second scheduling step 102 is then performed, followed by checking the availability of the product A. The consolidation location may be checked first for availability of ordered products. For business purposes, it is reasonable to first check the consolidation location 20 from where the ordered products are shipped directly to the customer 10 rather than first checking other locations 30 and 40 from where the products first have to be transferred to the consolidation location. In the second scheduling step 102, the material availability date of the consolidation location CL, 20 may be calculated based on the above-mentioned delivery date.

After the scheduling step 102, a further scheduling step 103 may be performed for each product location 30, 40 determined within the ATP-rules evaluation. In scheduling step 103, the material availability date for the product locations 30 and 40 is calculated from the material availability date calculated in step 102.

Then, the product locations 30, 40 and the consolidation location 20 can be checked for availability of the ordered products. The result of this ATP check can be a plurality of confirmed material availability dates, whereby the result of each product location may consist of several confirmed material availability dates. After the availability check, the confirmed material availability dates of the product locations 30, 40 are scheduled for the customer 10 via the consolidation location 20.

Figure 2B:
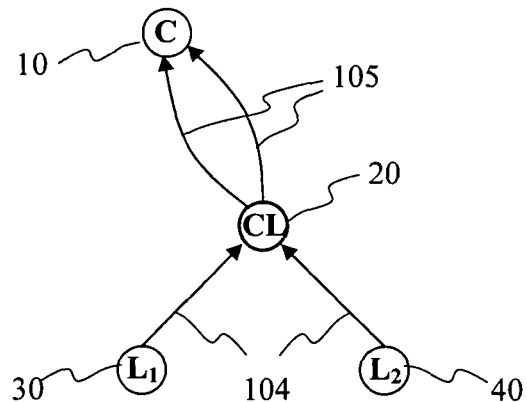

FIG. 2b shows the second part of the exemplary scheduling process of the consolidation process. In this second part, for the product location 30 and 40, the delivery dates for the consolidation location 20 may be calculated from the confirmed material availability dates. This calculation is performed in scheduling steps 104. Products having the same delivery date in the consolidation location 20 may be merged into one result whereby the quantities of the products are added together.

Furthermore, products that have different delivery dates may be merged into one result if the above-mentioned delivery date correlation flag in the corresponding ATP rule is set. In this case, the determined delivery dates are changed to the latest delivery. However, if the above-mentioned delivery date correlation flag is not set, no delivery date correlation in the consolidation location is performed. In such cases, each product may be independently scheduled for delivery from the consolidation location to the customer.

Figure 2C:
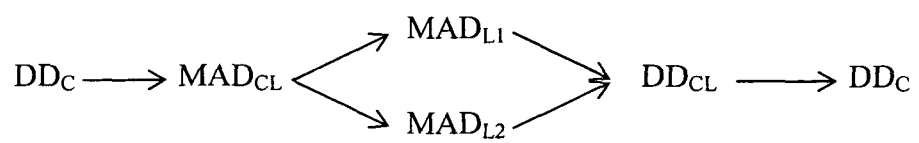

In the next scheduling steps 105, the delivery dates for the customer 10 are calculated from the delivery dates of the consolidation location 20. In FIG. 2c, the sequence of the calculations is shown, whereby $MAD_x$ represents the material availability date at location X and $DD_x$ represents the delivery date at location X.

In Table 1, a numerical example according to FIG. 2a and FIG. 2b is given assuming transportation times of 3 days and 2 days from $L_1$ and $L_2$, respectively, to CL and 2 days from CL to the customer.

In the case where the ordered products are delivered in just one delivery from the consolidation location 20 to the customer 10, all confirmed delivery dates at the consolidation location 20 are correlated to the latest date (Nov. 8, 2005) and then are scheduled to the customer 10 (Nov. 10, 2005). Then, new material availability dates at the product locations 30, 40 are calculated backwards from the latest delivery date at the consolidation location 20 (Nov. 8, 2005).

Figure 3A:
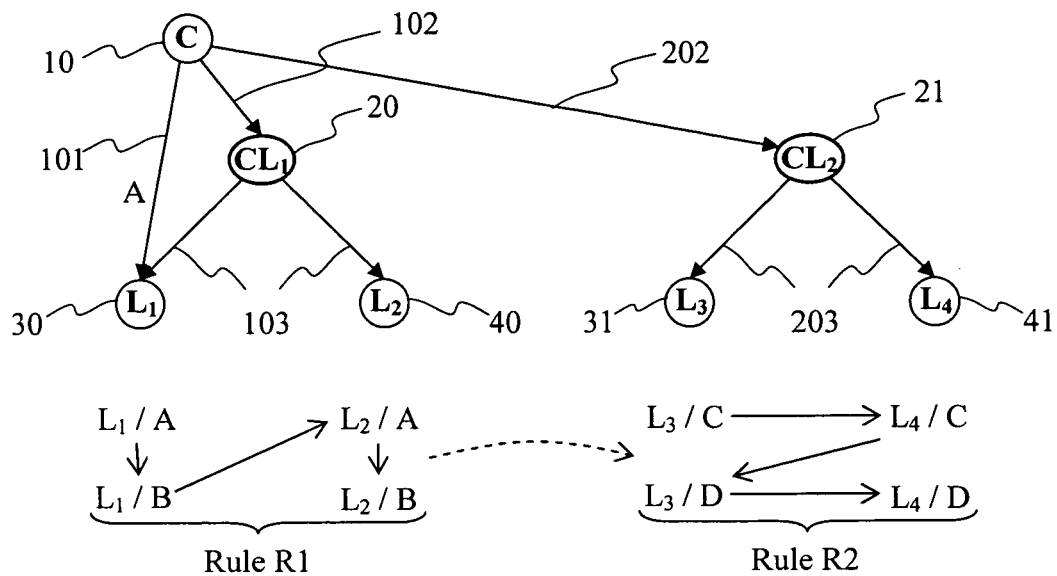
FIGS. 3a, 3b, 3c illustrate an exemplary scheduling process for consolidation considering two consolidation locations, consistent with an embodiment of the invention.
Figure 3B:
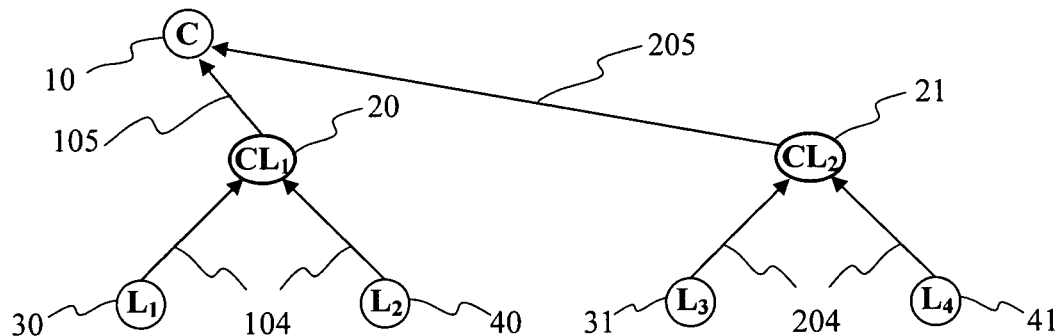

FIG. 3a and FIG. 3b illustrate an exemplary scheduling process for a consolidation process relating to two consolidation locations, consistent with an embodiment of the invention. FIG. 3a illustrates the first part of the scheduling process as described above in reference to FIG. 2a. FIG. 3b illustrates the second part of the scheduling process as described above in reference to FIG. 2b.

Customer 10 orders product A in location $L_1$, 30. In the first scheduling step 101, the material availability date for the product location 30 is determined. After scheduling step 101, the ATP rules are determined and evaluated in order to determine the consolidation locations. Hereby, ATP rule R1 is determined, and the evaluation returns a plurality of substitution requirements, whereby $L_1/A \rightarrow L_1/B$ describes a product replacement at location $L_1$, and $L_1/B \rightarrow L_2/A$ describes a product and location replacement, and $L_2/A \rightarrow L_2/B$ describes a product replacement at location $L_2$. In addition to these substitution requirements, the evaluation returns the requirements $CL_1/A$ and $CL_1/B$.

In the second scheduling step 102, the material availability dates for the products A and B in the consolidation location 20 ($CL_1/A$, $CL_1/B$) are determined accordingly to the description above in reference to FIG. 2a. In the following third scheduling steps 103, the material availability dates for the products A and B in the product location $L_1$, and $L_2$ ($L_1/A$, $L_1/B$, $L_2/A$, $L_2/B$) are determined. Now, availability of the products in each location can be checked.

After the availability has been checked, the scheduling steps 104 and 105 (FIG. 3b) are performed, similar to the description above in reference to FIG. 2b, in order to determine the delivery dates for the consolidation location 20 and the customer 10.

If a quantity still remains after this availability checks, a second ATP rule R2 may be determined and the evaluation returns further substitution requirements, whereby $L_3/C \rightarrow L_4/C$ describes a location replacement, $L_4/C \rightarrow L_3/D$ describes a product and location replacement, and $L_3/D \rightarrow L_4/D$ describes a location replacement. In addition to these substitution requirements, the evaluation may return the requirements $CL_2/C$ and $CL_2/D$. The material availability dates for the products C and D may be determined according the following sequence:

$$CL_2/C \rightarrow L_3/C \rightarrow L_4/C \rightarrow CL_2/D \rightarrow L_3/D \rightarrow L_4/D.$$

Accordingly, the material availability dates for all locations with respect to the product C are determined first and then the material availability dates for all locations with respect to the product D are determined.

Finally, the scheduling steps 204 and 205 (FIG. 3b) are performed in order to determine the delivery dates for the consolidation location 21 and the customer 10, respectively.

TABLE 1

| Product/ Location | MAD | Confirmed MAD | Confirmed quantity | DD in consolidation location | DD at customer |
| --- | --- | --- | --- | --- | --- |
| $A/L_1$ | Nov. 1, 2005 | Nov. 1, 2005 | 10 | Nov. 4, 2005 | Nov. 6, 2005 |
| | | Nov. 3, 2005 | 5 | Nov. 6, 2005 | Nov. 8, 2005 |
| $A/L_2$ | Nov. 2, 2005 | Nov. 2, 2005 | 15 | Nov. 4, 2005 | Nov. 6, 2005 |
| | | Nov. 6, 2005 | 20 | Nov. 8, 2005 | Nov. 0, 2005 |

Figure 3C:
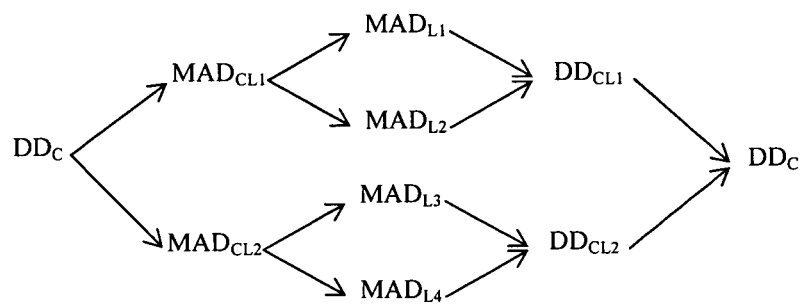

In FIG. 3c, the sequence of the calculations is shown, whereby $MAD_x$ is representing the material availability date in location X and $DD_x$ is representing the delivery date in location X.

In Tables 2 through 5, an example according to FIG. 3a and FIG. 3b is provided.

TABLE 2

| Product/Location | Confirmed MAD | Confirmed quantity |
| --- | --- | --- |
| A/L₁ | Nov. 1, 2005 | 10 |
|  | Nov. 3, 2005 | 5 |
| A/L₂ | Nov. 1, 2005 | 15 |
|  | Nov. 5, 2005 | 20 |
| B/L₁ | Nov. 5, 2005 | 10 |
| C/L₃ | Nov. 2, 2005 | 10 |
|  | Nov. 5, 2005 | 5 |
| C/L₄ | Nov. 7, 2005 | 15 |
| D/L₃ | Nov. 8, 2005 | 10 |
| D/L₄ | Nov. 8, 2005 | 20 |

TABLE 3

| Product/Location | Confirmed MAD | Confirmed quantity |
| --- | --- | --- |
| A/CL₁ | Nov. 3, 2005 | 25 |
|  | Nov. 5, 2005 | 5 |
|  | Nov. 7, 2005 | 20 |
| B/CL₁ | Nov. 7, 2005 | 10 |
| C/CL₂ | Nov. 4, 2005 | 10 |
|  | Nov. 7, 2005 | 5 |
|  | Nov. 9, 2005 | 15 |
| D/CL₂ | Nov. 10, 2005 | 30 |

TABLE 4

| Product/Location | Confirmed MAD | Confirmed quantity | DD in consolidation location | DD at customer | Correlated DD at customer |
| --- | --- | --- | --- | --- | --- |
| A/CL₁ | Nov. 3, 2005 | 25 | 6 Nov. 2005 | Nov. 8, 2005 | 12 Nov. 2005 |
|  | Nov. 5, 2005 | 5 | 8 Nov. 2005 | Nov. 10, 2005 | 12 Nov. 2005 |
|  | Nov. 7, 2005 | 20 | 10 Nov. 2005 | Nov. 12, 2005 | 12 Nov. 2005 |
| B/CL₁ | Nov. 7, 2005 | 10 | 10 Nov. 2005 | Nov. 12, 2005 | 12 Nov. 2005 |
| C/CL₂ | Nov. 4, 2005 | 10 | 7 Nov. 2005 | Nov. 9, 2005 | 15 Nov. 2005 |
|  | Nov. 7, 2005 | 5 | 10 Nov. 2005 | Nov. 12, 2005 | 15 Nov. 2005 |
|  | Nov. 9, 2005 | 15 | 12 Nov. 2005 | Nov. 14, 2005 | 15 Nov. 2005 |
| D/CL₂ | Nov. 10, 2005 | 30 | 13 Nov. 2005 | Nov. 15, 2005 | 15 Nov. 2005 |

TABLE 5

| Product/Location | Correlated DD at customer | Confirmed quantity |
| --- | --- | --- |
| A/CL₁ | Nov. 12, 2005 | 50 |
| B/CL₁ | Nov. 12, 2005 | 10 |
| C/CL₂ | Nov. 15, 2005 | 30 |
| D/CL₂ | Nov. 15, 2005 | 30 |

Table 2 shows the confirmed material availability dates (MAD) for each product/location. Table 3 shows the merged results according to Table 2, whereby products having the same MAD are merged into one result in the consolidation location, for example, A/L₁ (Nov. 1, 2005) and A/L₂ (Nov. 1, 2005) are merged into A/CL₁ (Nov. 1, 2005) and the quantities are added together (10+15=25). Table 4 shows the delivery dates (DD) in the consolidation location and at the customer according to Table 3. The last column contains the correlated delivery date for each row. Finally, Table 5 shows the correlated delivery date to the customer according to Table 4.

Figure 4:
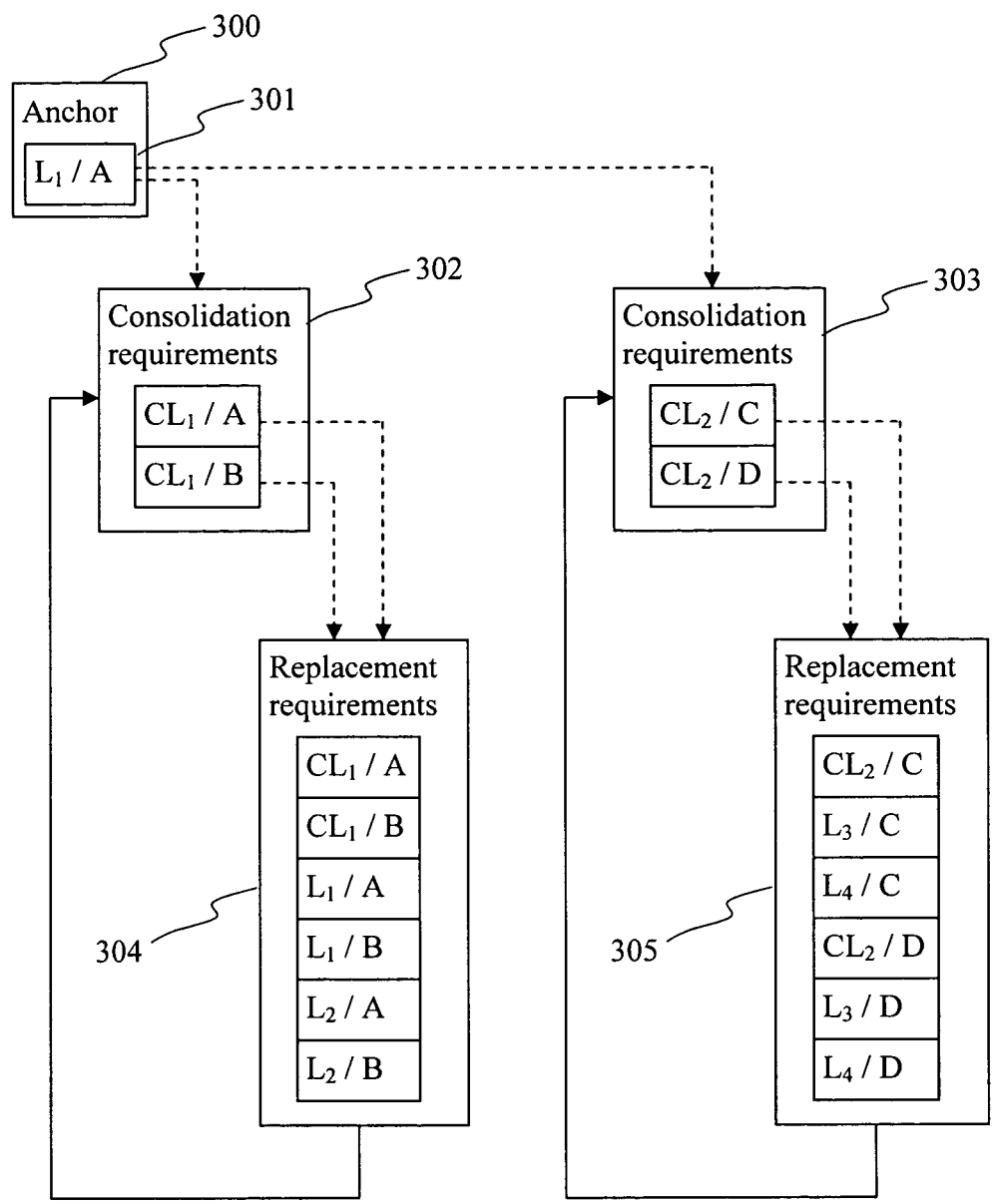
FIG. 4 illustrates an exemplary data structure according to FIGS. 3a and 3b, consistent with an embodiment of the invention.

FIG. 4 illustrates an exemplary data structure, consistent with an embodiment of the present invention. This exemplary data structure is built according to the data shown in FIG. 3a and FIG. 3b. First, the above-described method creates an anchor requirement group 300 comprising the input location product (L₁/A) 301. Then, the data structure is build according to the first determined ATP rule R1. A consolidation requirement group 302 is created containing only the requirements (CL₁/A, CL₁/B) for the consolidation location; that is, all combinations between the consolidation location and the product replacements of the ATP rule R1. In one embodiment consistent with the present invention, product A may be replaced by product B and, therefore, the consolidation requirement group 302 has the consolidation requirements CL₁/A and CL₁/B. This consolidation requirement group 302 is attached as a successor (dashed arrow) to the input location 301 of the anchor requirement group 300.

In one embodiment consistent with the present invention, the consolidation requirement group 302 may not be checked for availability. Therefore, a third requirement group, the replacement requirement group 304, is created, which comprises the new requirements from the ATP rule R1 (CL₁/A, CL₁/B, L₁/A, L₁/B, L₂/A, L₂/B). This replacement requirement group 304 is attached as a successor (dashed arrows) to every requirement (CL₁/A, CL₁/B) of the consolidation requirement group 302. Now the calculation of the material availability dates for the requirements L₁/A, L₁/B, L₂/A, and L₂/B under consideration of the consolidation location CL₁ is performed and availability is checked. The whole consolidation requirement group 302 is attached as a predecessor (solid arrow) to the replacement requirement group 304. Thereby the predecessor consolidation requirement group 302 can be found and the correlated and scheduled results of the replacement requirement group 304 can be attached to the corresponding consolidation requirements (CL₁/A, CL₁/B). The term "scheduled" means that the confirmation dates in the consolidation location are determined from the confirmation dates of the product locations. The term "corresponding" means that they have the same product, i.e., the results of all replacement requirements with the same product are correlated and attached to the consolidation location with this product, for example, the replacement requirements L₁/A and L₂/A are attached to the consolidation requirement CL₁/A, and the replacement requirements L₁/B and L₂/B are attached to the consolidation requirement CL₁/B.

Now the consolidation requirement group 303 and the replacement requirement group 305 are created according to the second ATP rule R2 and attached to the existing data structure as described above.

Figure 5:
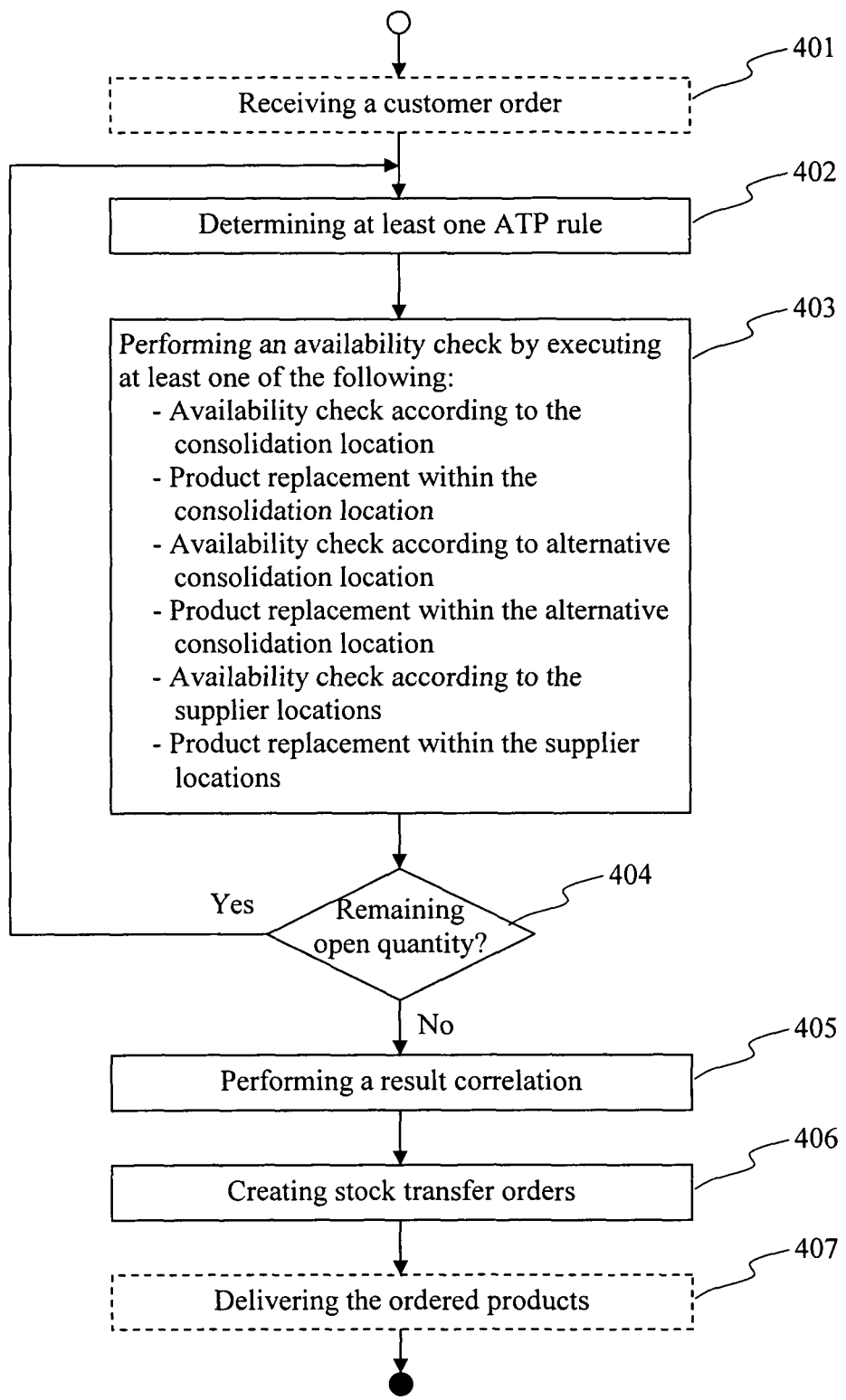
FIG. 5 illustrates a program flow of an exemplary method, consistent with an embodiment of the present invention.

FIG. 5 illustrates a program flow of an exemplary method, consistent with an embodiment of the present invention. As shown in FIG. 5, the process may begin by receiving a customer order 401 comprising at least a product and the quantity of the product ordered.

In second step 402, at least one ATP rule is determined according to the data of the customer order. In one embodiment consistent with the present invention, a plurality of ATP rules may be defined. This step 402 also comprises evaluating the determined ATP rules. This evaluation comprises selecting the consolidation location and determining the product replacements and the location replacements.

The next step 403 is performed according to the results of the evaluation in step 402. In step 403, an availability check for the ordered products is performed. During the availability check, at least one of the following sub-methods or sub-steps may be performed:

checking availability according to the consolidation location;

performing a product replacement for the consolidation location;

checking availability according to an alternative consolidation location;

performing a product replacement for the alternative consolidation location;

checking availability according to the supplier locations; and performing a product replacement for the supplier locations.

If more than one of these sub-methods or sub-steps are performed, then the sequence of the sub-methods or sub-steps depends on the results of the evaluation in step 402, whereby "checking availability according to the consolidation location" may be performed first. The reason for checking availability first according to the consolidation location may be that a stock transfer is not necessary for products which can be confirmed by an availability check in the consolidation location if the consolidation is performed in the consolidation location.

In one embodiment consistent with the present invention, the ATP rules may comprise consolidation locations which are excluded from the availability check, for example, when a consolidation location is closed for maintenance or unavailable because of natural disasters. For such consolidation locations, a plurality of validity periods may be defined which define the validity of the exclusion. This means that these consolidation locations are valid beyond these exclusion periods and, therefore, not excluded completely from the availability check. Furthermore, alternative consolidation locations may be defined for excluded consolidation locations. It may be also possible that a consolidation location is overridden by an external consolidation location.

If a quantity still remains open in step 404 after the availability check, then the above-described method returns to step 402 by determining and evaluating the next ATP rule. If all the ordered quantity is confirmed by the availability check, then the method may continue to step 405, which performs a result correlation, if necessary. Continuing with the next step 406, the exemplary method creates a plurality of stock transfer orders between the product locations and the consolidation locations. After this, the process ends by delivering the ordered products from the consolidation location to the customer.

Embodiments consistent with the present invention, including the above-described systems and methods, may be implemented in digital electronic circuitry, or in computer hardware, firmware, software, or in combinations thereof. Apparatus consistent with the present invention can be implemented in a computer program product tangibly embodied in a machine-readable storage device for execution by a programmable processor. Method steps consistent with the present invention can be performed by a programmable processor executing a program of instructions to perform functions or steps of the methods, such as those described above, by operating on the basis of input data and by generating output data. Furthermore, systems and methods consistent with the present invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks mentioned above may be used, for example, for producing goods, delivering parts for assembling products, controlling technical or economical processes, or implementing telecommunication activities.

To provide for interaction with a user, the embodiments of the present invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g., an RF communication link). A display is coupled to an interface, which is coupled to an I/O bus. A keyboard and pointing device are also coupled to the I/O bus. Alternatively, separate buses may be used for the keyboard pointing device and I/O interface.

In the foregoing specification, aspects of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computer-implemented method for processing, within a supply chain management system, a product order received from a customer, the method comprising:
   determining, by a processor, at least one consolidation location for products of the received order based on at least one of a plurality of available-to-promise rules;
   determining, by a processor, at least one supplier location for the products based on at least one of the available-to-promise rules;
   performing, by a processor, an availability check for the products based on the available-to-promise rules, the availability check including:
      performing, by a processor, an availability check for at least a part of the products at the at least one consolidation location before performing an availability check for the part of the products at any other supplier location; and
      performing, by a processor, an availability check for at least a part of the products at the at least one supplier location;
   shipping the products found to be available at a location other than the consolidation location to the consolidation location; and
   processing the products at the consolidation location.

2. The computer-implemented method of claim 1, wherein the available-to-promise rules further comprise at least one consolidation location which is excluded from the availability check.

3. The computer-implemented method of claim 2, wherein the at least one excluded consolidation location has a plurality of validity periods which defines the validity of the exclusion.

4. The computer-implemented method of claim 2, wherein the available-to-promise rules further comprise at least one alternative consolidation location with respect to at least one excluded consolidation location.

5. The computer-implemented method of claim 1, wherein the available-to-promise rules further comprise a replacement external consolidation location for the at least one determined consolidation location.

6. The computer-implemented method of claim 1, wherein the available-to-promise rules further comprise alternative products for the ordered products.

7. The computer-implemented method of claim 1, wherein the available-to-promise rules further comprise a result correlation flag indicating whether a delivery date correlation of the products to be delivered from the at least one consolidation location to the customer is to be performed at the at least one consolidation location.

8. The computer-implemented method of claim 7, further comprising the steps of:
   determining at least one available-to-promise rule out of the plurality of available-to-promise rules; and
   performing an availability check according to the determined at least one available-to-promise rule.

9. The computer-implemented method of claim 8, further comprising the steps of:
   creating at least one stock transfer order which triggers a transfer of the products from the at least one supplier location to the at least one consolidation location; and
   performing a delivery date correlation at the at least one consolidation location.

10. The computer-implemented method of claim 9, wherein the step of determining the at least one available-to-promise rule is performed based on a set of definable parameters.

11. The computer-implemented method of claim 10, wherein the step of performing an availability check comprises at least one of:
   performing an availability check according to an external consolidation location;
   performing a product replacement within the at least one consolidation location;
   performing an availability check according to at least one alternative consolidation location;
   performing a product replacement at an at least one alternative consolidation location; and
   performing a product replacement within the at least one supplier location.

12. The computer-implemented method of claim 11, wherein performing an availability check according to the external consolidation location is performed before performing an availability check or performing a product replacement at any other location.

13. An apparatus for processing a product order received from a customer, the apparatus comprising:
   a data storage device within a supply chain management system for storing data about a plurality of products;
   a processor;
   a memory storing instructions which, when executed by the processor, perform a method comprising:
      determining, by a processor, at least one consolidation location for products of the received order based on at least one of a plurality of available-to-promise rules;
      determining, by a processor, at least one supplier location for the products based on at least one of the available-to-promise rules;
      performing, by a processor, an availability check for the products based on the available-to-promise rules, the availability check including:
         performing, by a processor, an availability check for at least a part of the products at the at least one consolidation location before performing an availability check for the part of the products at any other supplier location;
         performing, by a processor, an availability check for at least a part of the products at the at least one supplier location;
      shipping the products found to be available at a location other than the consolidation location to the consolidation location; and
      processing the products at the consolidation location.

14. The apparatus of claim 13, wherein the available-to-promise rules further comprise at least one consolidation location which is excluded from the availability check.

15. The apparatus of claim 13, wherein the available-to-promise rules further comprise a replacement external consolidation location for the at least one determined consolidation location.

16. The apparatus of claim 13, wherein the available-to-promise rules further comprise a result correlation flag indicating whether a delivery date correlation of the products to be delivered from the at least one consolidation location to the customer is to be performed at the at least one consolidation location.

17. A computer-readable non-transitory storage medium comprising computer-executable instructions for causing a processor to perform a method for processing, within a supply chain management system, a product order received from a customer, the method comprising:

determining, by a processor, at least one consolidation location for products of the received order based on at least one of a plurality of available-to-promise rules;

determining, by a processor, at least one supplier location for the products based on at least one of the available-to-promise rules;

performing, by a processor, an availability check for the products based on the available-to-promise rules, the availability check including:

performing, by a processor, an availability check for at least a part of the products at the at least one consolidation location before performing an availability check for the part of the products at any other supplier location;

performing, by a processor, an availability check for at least a part of the products at the at least one supplier location;

shipping the products found to be available at a location other than the consolidation location to the consolidation location; and processing the products at the consolidation location.

18. The computer-readable medium of claim 17, wherein the plurality of available-to-promise rules further comprise at least one consolidation location which is excluded from the availability check.

19. The computer-readable medium of claim 17, wherein the available-to-promise rules further comprise a replacement external consolidation location for the at least one determined consolidation location.

20. The computer-readable medium of claim 17, wherein the plurality of available-to-promise rules further comprise a result correlation flag indicating whether a delivery date correlation of the products to be delivered from the at least one consolidation location to the customer is to be performed at the at least one consolidation location.

21. The computer-readable medium of claim 20, further comprising the steps of:

determining at least one available-to-promise rule out of the plurality of available-to-promise rules; and performing an availability check according to the determined at least one available-to-promise rule.

22. The computer-readable medium of claim 21, further comprising the steps of:

creating at least one stock transfer order which triggers a transfer of the products from the at least one supplier location to the at least one consolidation location; and performing a delivery date correlation at the at least one consolidation location.

23. The computer-readable medium of claim 22, wherein the step of determining the at least one available-to-promise rule is performed based on a set of definable parameters.

24. The computer-readable medium of claim 23, wherein the step of performing an availability check comprises at least one of:

performing an availability check according to an external consolidation location;

performing a product replacement within the at least one consolidation location;

performing an availability check according to at least one alternative consolidation location;

performing a product replacement at an at least one alternative consolidation location; and performing a product replacement within the at least one supplier location.

25. The computer-readable medium of claim 24, wherein performing an availability check according to the external consolidation location is performed before performing an availability check or performing a product replacement at any other location.

* * * * *